(12) United States Patent
Abernathy

(10) Patent No.: US 10,353,389 B2
(45) Date of Patent: Jul. 16, 2019

(54) AUGMENTED REALITY CROSS-CUEING SYSTEMS AND METHODS

(71) Applicant: Rapid Imaging Technologies, LLC., Middleton, WI (US)

(72) Inventor: Michael Franklin Abernathy, Albuquerque, NM (US)

(73) Assignee: RAPID IMAGING TECHNOLOGIES, LLC, Middleton, WI (US)

(*) Notice: Subject to any disclaimer, the term of this patent is extended or adjusted under 35 U.S.C. 154(b) by 276 days.

(21) Appl. No.: 15/352,959

(22) Filed: Nov. 16, 2016

(65) Prior Publication Data

US 2018/0136813 A1 May 17, 2018

(51) Int. Cl.
*G05D 1/00* (2006.01)
*G06F 3/0481* (2013.01)

(52) U.S. Cl.
CPC ......... *G05D 1/0044* (2013.01); *G05D 1/0038* (2013.01); *G06F 3/0481* (2013.01)

(58) Field of Classification Search
CPC ... G05D 1/0044; G05D 1/0038; G06F 3/0481
See application file for complete search history.

(56) References Cited

U.S. PATENT DOCUMENTS

| | | | |
|---|---|---|---|
| 2010/0084513 A1* | 4/2010 | Gariepy | B64C 39/024 244/190 |
| 2013/0321397 A1* | 12/2013 | Chen | G06T 17/05 345/419 |
| 2014/0053077 A1* | 2/2014 | Unnikrishnan | G06F 3/04815 715/747 |
| 2015/0142211 A1* | 5/2015 | Shehata | H04N 7/181 701/2 |

* cited by examiner

*Primary Examiner* — Roland J Casillas
(74) *Attorney, Agent, or Firm* — Loza & Loza LLP; Richard H. Krukar

(57) ABSTRACT

Cross-cueing systems allow users to instantly understand the geographic location of objects in the video scene, as well as instantly understand the location within the scene of objects on a map. This provides an unprecedented level of situation awareness for unmanned vehicle operators and video surveillance system operators.

20 Claims, 7 Drawing Sheets

AUGMENTED REALITY CROSS-CUEING SYSTEMS AND METHODS

TECHNICAL FIELD

Embodiments relate to navigation unmanned vehicles, mapping, graphical user interfaces, and ground stations. In particular, embodiments relate to display of information to allow cross-cueing between map and video displays for enhanced situation awareness.

BACKGROUND

Prior art cueing systems do not provide an immediate bi-lateral ability for camera operators and unmanned vehicle operators to see the relationship between the video received from an unmanned vehicle (UV) and a map of the area in which the UV is operating. Consequently, they could only recognize a landmark if it happened to be labeled. Therefore, systems and methods for cross-cueing between a map display and a camera feed are needed.

BRIEF SUMMARY

Aspects of the embodiments address limitations and flaws in the prior art by producing color coded hazard maps that are rapidly understandable. It has been, determined in practice that color coded two-dimensional surface maps are usually understood more rapidly than three dimensional displays.

It is therefore an aspect of the embodiments that a ground station provides a graphical user interface (GUI) and a cursor control device such as a mouse, touch pad, track ball, or other device. The GUI can display visual information to a user and the user can interact with or manipulate the visual information via cursor control, keyboard, touch, etc. The GUI displays a map view and a camera view. The map view displays map imagery, typically obtained from an electronic map, to the user and provides a map cursor that the user can move around with the map view. The map imagery can simply indicate road locations or geographic feature locations. The map imagery can include satellite images for display to the user. Furthermore, the map imagery can be overlaid with labels, annotations, or graphics. The camera view can display images, typically a live video feed, obtained from an unmanned vehicle (UV). The camera view can also provide a camera cursor that the user can move around within the camera view.

It is another aspect of the embodiments that the UV can provide image data to the ground station. The UV can have an optics package with camera and lens capturing the image data and a communications module that transmits the image data to the ground station for display in the camera view. A UV providing a live video stream typically has a video camera within the optics package and a radio frequency (RE) transmitter within the communications module. Those familiar with remote video and wireless video transmission are familiar with many means for transmitting and receiving video information.

It is yet another aspect of the embodiments that the UV has a geographic position sensor. The geographic position sensor can use one of the satellite navigation technologies such as the Global Positioning System (GPS) or Global Navigation Satellite System (GLONASS).

It is a further aspect of the embodiments that the user can manipulate the cursor control device to directly control an active cursor within the active view. The active view can be the camera view, the map, view, but not both. The active cursor can be the camera cursor or the map cursor, but never both. The active cursor is the camera cursor when the active view is the camera view. The active cursor is the map cursor when the active view is the map view. Directly controlling the active cursor means that the user's manipulations (left, right, up, down, or screen touch) cause the active cursor to move in a corresponding direction or to the touched screen location in the active view. Note that a view and cursor can become active at the same time by, for example, moving a screen cursor into a view and clicking a mouse button. The user can manipulate the active cursor to select a place shown in the active view.

It is a yet further aspect of the embodiments to automatically move the other cursor, called the reactive cursor in the reactive view. The reactive view is the map view when the active view is the camera view. The reactive view is the camera view when the active view is the map view. The reactive cursor is the map cursor when the active cursor is the camera cursor. The reactive cursor is the camera cursor when the active cursor is the map cursor. The user indirectly controls the reactive cursor because the reactive cursor is automatically moved in the reactive view to indicate the place selected by the user in the active view. The user selects a place in the active view; the cross-cueing system moves the reactive cursor to show the user that same place in the reactive view.

It is still another aspect of the embodiments that mapped locations can be annotated by, for example, pairing map coordinates with. The map view can show the labels for a map coordinates falling with the displayed map imagery. The electronic map can include height data as well as map imagery, satellite imagery, annotations, and geographic features (roads, rivers, structures, etc.). The height data is typically referenced to mean sea level (MSL), particularly for terrain but can be in referenced to the ground level (AGL—above ground level) for man-made structures. Note that terrain, by definition, has a height of 0.0 AGL.

It is still yet another aspect of the embodiments that the UV has a known geographic position and height. The UV's height can also be provided as MSL or AGL. Note that a height at a location can be converted between AGL and MSL by adding or subtracting the MSL height of the terrain at that particular location. As such, the terms "height" and "altitude" are understood to be MSL or AGL with any conversions between the two occurring as needed.

It is still yet a further aspect of the embodiments to calculate lines of sight data indicating if a point on the surface (a map location) is either within the line of sight of the UV or it isn't. For example, an algorithm can step through the electronic map and, for every mapped point, determine if that point is visible from the UV. Line of sight algorithms are well known and well researched and the practitioner can use a known algorithm or simply write one. For example, for each mapped point, draw a line to the UV and, for each mapped point along the line, check the height to see if something at that point is blocking the view. Those familiar with trigonometry or geometry can easily discern many other algorithms for determining line of sight. As a general rule, any location that is not in the UV's line of sight cannot be seen in the camera view and an occluded location or place.

The line of sight data can be used to change how labels are displayed for mapped locations and places. If a location is occluded (not in UV's line of sight and not in the camera view), then the label for that location cannot be shown or can be shown differently than those labels for non-occluded mapped locations. For example, different colors, fonts, or shapes can be used. A specific example is that a map location that is in the UV's line of sight can be labeled using a bold font while a map location that is occluded can be labeled using a non-bold or regular font. A user can select a place in the map view that is not visible in the camera view. In such cases, a map cursor indicating an occluded place or location can be displayed such that it appears different from a map cursor indicating a place or location that is not occluded. The camera cursor can similarly have a changed appearance to indicate that a place or location has been selected that is not visible in the camera view. For example, the camera cursor can appear as a thick lined diamond when a building is selected and as a thin lined cross when a place behind the building is selected. In some cases, the camera cursor can be invisible when an occluded place is selected. In other cases, the map cursor can be automatically moved to the location on the object occluding the selected place or an additional cursor or indicator can be displayed indicating the occluding object. For example, the user can select a place behind and occluded by a building. The camera cursor and map cursor can be displayed with an appearance indicating that an occluded place is selected and a line can be drawn in the map view from the selected location to the building.

Line of sight data can be calculated for the entire map or for that portion of the map appearing in the map view. In such a case, the map view can indicate map locations, or areas, that are not in the UV's line of sight by, for example, shading or greying those areas, drawing a visible boundary around those areas or by using some other visual indicator that makes those areas noticeably different.

It is still yet a further aspect of the embodiments that the UV can have a distance measuring device. The user can select a location in the camera view and the distance to that location measured by the distance measuring device. For example, a laser ranging device, perhaps using a turret that does not also aim the camera, can be aimed at the camera cursor location and a distance measured. Standard trigonometric calculations involving UV height. UV location, terrain height, and map coordinates can indicate where to place the map cursor. Another way to measure the distance to the object is triangulation using two different UV locations.

Still yet another aspect of the embodiments is that the UV location and heading can be indicated on the map view using, for example, an icon for the UV and a line, arrow, or other indicator for the heading.

A still yet further aspect of the embodiments is that the camera view can be indicated on the map view by displaying an indicated camera view. For example, the camera view can be bounded by a visible trapezoid, polygon, curve, line pair, or other visual indicator. Alternatively, the camera view can be shaded, sharpened, or otherwise highlighted. Most embodiments will not use the line of sight data to alter the indicated camera view although some embodiments will use the line of sight data to alter the indicated camera view.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE II INVENTION

The particular values and configurations discussed in these non-limiting examples can be varied and are cited merely to illustrate embodiments and are not intended to limit the scope of the invention.

There is no way of knowing, a priori, which elements of a scene will be of geographic interest to an operator. Therefore, labeling some elements of the scene can provide the level of geographic awareness required by the operator. The proposed system allows a user to place a mouse cursor in the camera view and immediately see that location projected on to a companion map view in real time. Thus, the user can instantly see both the camera scene location of an object and the exact geographic location of the object in real time.

Figure 1:
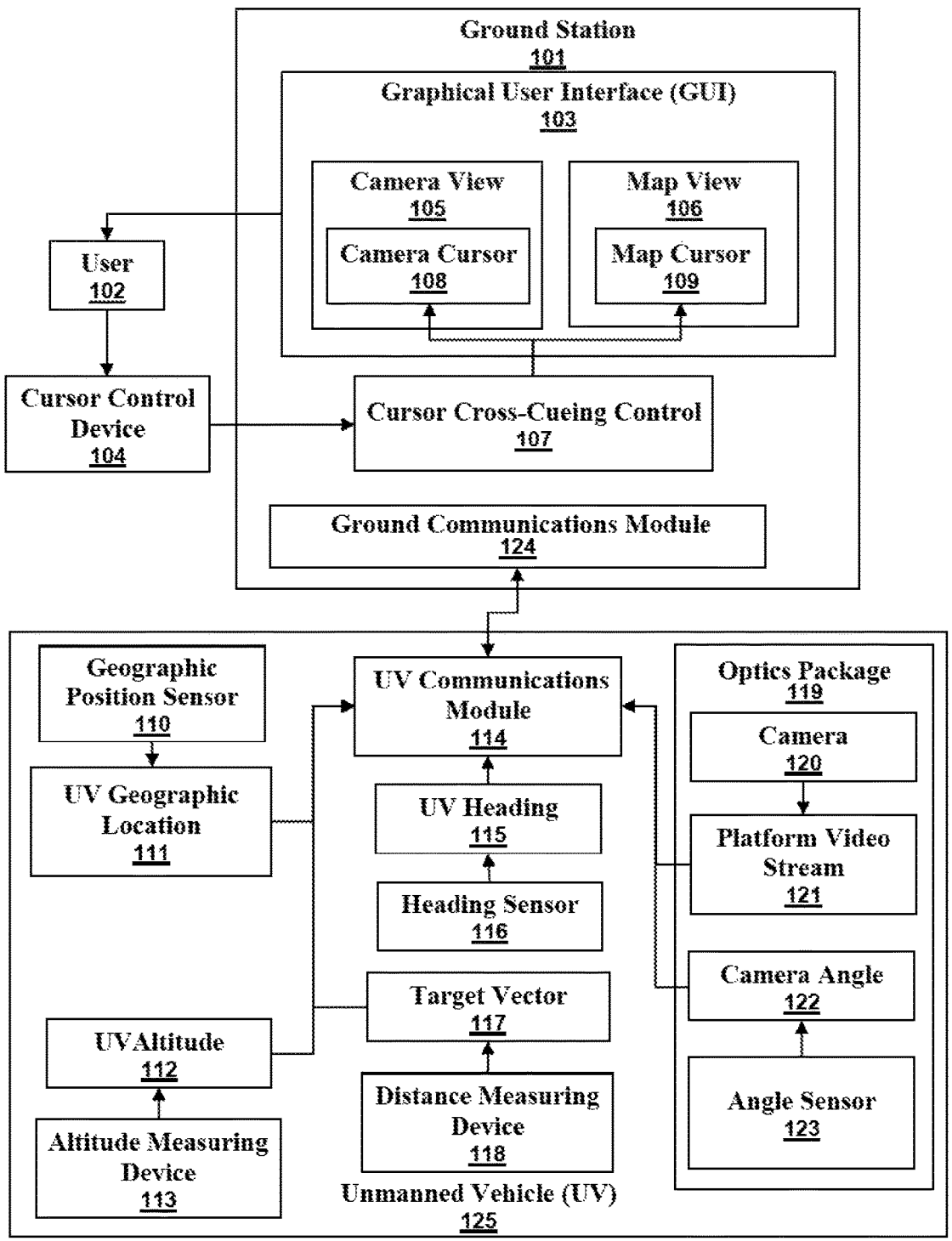
FIG. 1 illustrates a system for augmented reality cross-cueing in accordance with aspects of the embodiments.

FIG. 1 illustrates a system for augmented reality cross-cueing in accordance with aspects of the embodiments. A ground station 101 presents a graphical user interface (GUI) 103 to a user 102. The user 102 can interact with the GUI 103 by manipulating a cursor control device 104. The GUI 103 has a camera view and a map view and can have many other elements such as controls, views, data fields, etc. A camera cursor 108 is shown in the camera view 105 and a map cursor 109 is shown in the map view 106. A ground communications module 124 can communicate with a UV communications module 114 in unmanned vehicle (UV) 125. Ground communications module 124 and UV communications module 114 can be in direct communication via one or more radio frequency (RF) links or other wireless communications links. Alternatively, the ground station communications module 124 and UV communications module 114 can be in indirect communications wherein information is passed from one to the other via a number of intermediate links such as relays, repeaters, ground based networks using wire or fiber, or other communications intermediaries. In some embodiments, the UV communications module 114 can connect directly to a communications network or the ground station via a wire or fiber.

A cursor cross-cueing control 107 can coordinate movements of the camera cursor and the map cursor. Either the camera view or the map view can be the active view. When the camera view is the active view, the camera cursor is the active cursor. When the map view is the active view, the map cursor is the active cursor. When the map cursor is the active cursor, the camera cursor is the reactive cursor. When the camera cursor is the active cursor, the map cursor is the reactive cursor. The user can use the cursor control device to move the active cursor around in the active view to select or indicate places or locations. The cursor cross-cueing control 107 automatically moves the reactive cursor in the reactive view such that the reactive cursor also indicates the place or location. For example, when the user uses the active cursor to indicate a spot on a road in the active view, then the cursor cross cueing control 107 automatically moves the reactive cursor to indicate that spot on the road in the reactive view.

An unmanned vehicle (UV) 125 can have a number of sensors and subsystems that produce data for transmission to a receiver such as ground station 101. Geographic position sensor 110 that produces data such as a UV geographic location 111, UV altitude 112, and other location data which can be, for example, a map coordinate, GPS coordinate, AGL height, MSL height, etc. Altitude measuring device 113 can produce data such as UV altitude 112. This altitude determination may seem redundant in the other sensors, may also produce an altitude measurement, but different sensors can be better than others or can validate or calibrate another sensor's output. Distance measuring device 118 can produce data including a target vector 117 which can be a measurement of the direction and distance from UV 125 to a target or place on the ground. Heading sensor 116 can produce data including UV heading 115 indicating the direction that the UV facing. The heading can be two dimensional as if the UV is moving horizontally or can be three dimensional. Three dimensional heading data can be used for calculations such as elevation angle calculations. Optics package 119 can include a camera 120 and angle sensor 123. The camera 120 can produce imagery such as platform video stream 121 for transmission to the ground station 101 and display in the camera view 105. Angle sensor 123 can produce data such as camera angle 122 which can be a measurement of the angle, in three dimensions, between the camera main axis and a horizontal plane (aka elevation angle). Alternatively, the camera angle can be the angle between the camera main axis and the UV main axis such that the elevation angle can be derived from the UV heading 115 and the camera angle 122. The sensors and communications equipment herein disclosed are typical of those currently used in unmanned vehicles, particularly those used by the U.S. military.

Figure 2:
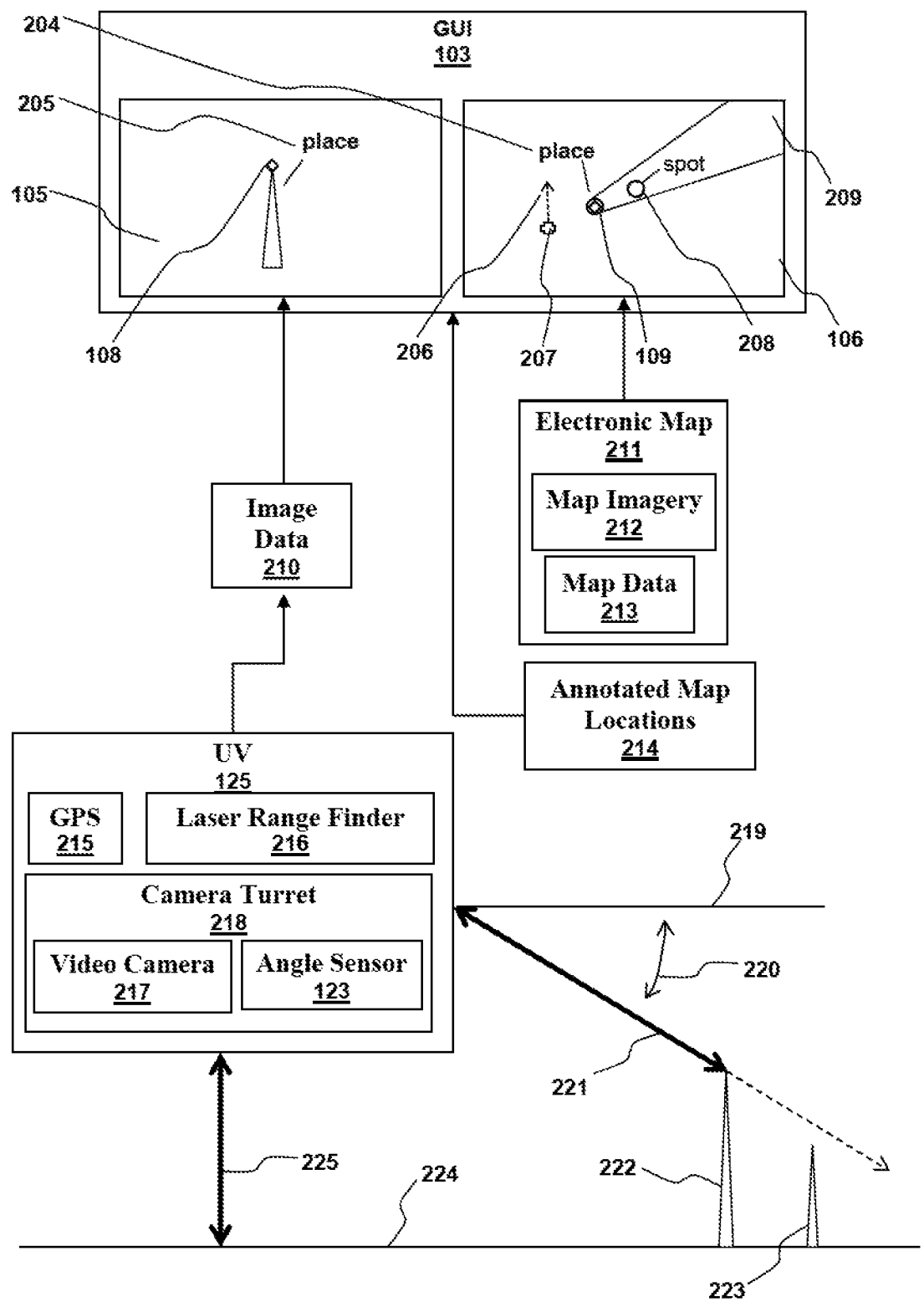
FIG. 2 illustrates an unmanned vehicle and electronic map supplying imagery to a graphical user interface in accordance with aspects of the embodiments.

FIG. 2 illustrates an unmanned vehicle 125 and electronic map 211 supplying imagery to a graphical user interface 103 in accordance with aspects of the embodiments. The user 102 has used one of the cursors to select a place and the system has moved the other cursor to also indicate the place. The place has been labeled 204, 205 in the map and camera views 106, 105. An icon 207 and arrow 206 are displayed in the map view 106 to indicate the UV location and heading, respectively. The map view 106 also shows an occluded area 209 that cannot be seen from the UV because it is hidden behind a structure, in fact, it is the structure selected by the user and labeled as "place." A spot 208 is labeled as "spot" with the label being in a regular font in contrast to the bold font used for "place." The regular font indicates that "spot" is occluded from the UV's view. The "place" and "spot" labels can be obtained from a database of annotated spot locations 214 that can associate labels with map coordinates.

Electronic map 211 can include map imagery 212 and map data 213. The map imagery 212 can be displayed in the map view 106 and can be images obtained from a satellite, road maps, aviation maps, or other graphical representations of maps. Map data 213 can include data such as the height at certain map coordinates as well as other data, including perhaps annotated map locations 214.

UV 125 is providing image data 210 to the ground station 101. The image data 210 can include live video from video camera 217 for display in camera view 105. Data from angle sensor 123, GPS 215, and laser range finder 216 can be included in image data 210 or can be transmitted separately to ground station 101. Video camera 217 is mounted to camera turret 218 such that it can be aimed without changing the UV heading. The camera can be aimed at a place 222 where an elevation angle 220 indicates the angle between a horizontal plane 219 and the camera main axis 221. A spot 223 is also shown that is occluded from the camera's view by place 222 because it is behind and lower than place 222. The elevation angle 220, UV altitude 225 in reference to a plane, "place" altitude in reference to the plane 224, and geographic coordinates of all three locations can be used determine if "spot" can be seen from UV 125.

Figure 3:
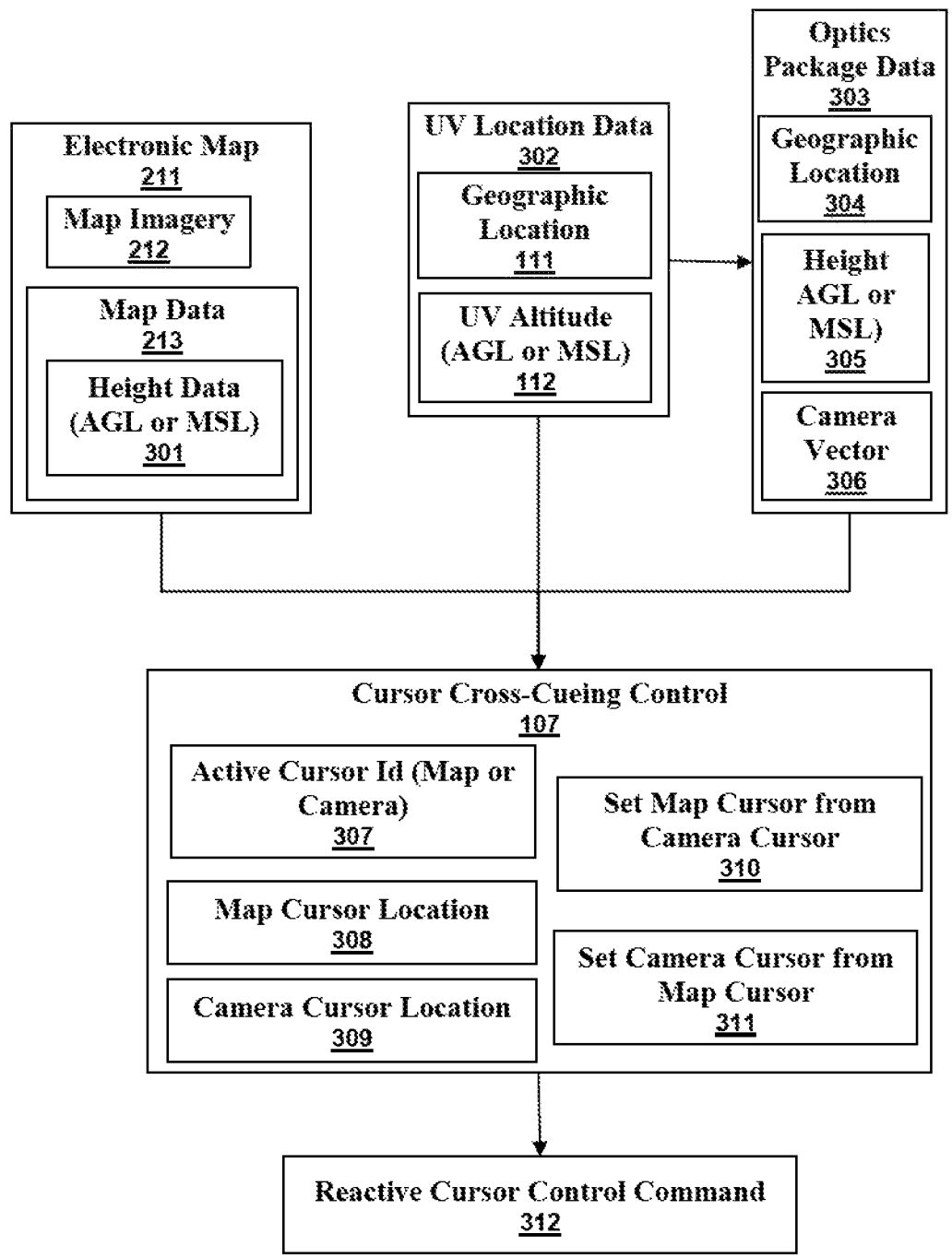
FIG. 3 illustrates augmented reality cross-cueing without line-of-sight data in accordance with aspects of the embodiments.

FIG. 3 illustrates augmented reality cross-cueing without line-of-sight data in accordance with aspects of the embodiments. The electronic map 211 provides height data 301 indicating the height of terrain and/or structures with the mapped area. UV location data 302 includes the UV geographic location 111 and altitude 112 in reference to the ground (AGL) or sea level (MSL). Note that for the calculations to proceed, altitudes should be referenced to, or converted to reference to, a common surface such as sea level. Optics package data 303 includes camera vector 306 and is illustrated as also including geographic location 304 and height 305. The location and height data can be obtained from the UV or can be obtained from sensors within the optics package itself because some optics packages can include such sensors. The camera vector is here assumed to be in reference to a normal to the common surface and may be the result of combining the measurements of a turret angle sensor, UV heading sensor, and other sensors.

Cursor cross-cueing control 107 can contain data such as the active cursor Id 307 (map cursor or camera cursor), map cursor location 308, and camera cursor location 309. If the user selects a location in the map view, then the map cursor is the active cursor and the system executes an algorithm to set the camera cursor from the map cursor 311. If the user selects a location in the camera view, then the system executes an algorithm to set the map cursor from the camera cursor 310.

The map cursor can be set from the camera cursor determining where a vector intersects the electronic map. The vector begins at the UV location in space and propagates in the direction of the camera vector. Those practiced in the arts of computer graphics and electronic cartography is familiar with algorithms for performing the required calculations. Here, the reactive cursor is the map cursor.

The camera cursor can be set from the map cursor by calculating the direction and length of a target vector beginning at the UV location and ending at the selected location. The camera vector beginning location and direction of the camera vector is known and is generally directly down the camera main axis it is a trivial exercise to draw a point on the camera main axis because it generally equates to simply drawing the cursor in the exact middle of the camera view. To draw the camera cursor over the target, an offset angle and offset distance can be calculated. The offset angle is direction of the target vector when projected on a plane normal to the camera axis. The offset distance is proportional to the target vector length and sine of the offset angle with the proportion depending on the angular field of view shown in the camera view. Here, the reactive cursor is the camera cursor.

With the location of the reactive cursor determined, the cursor cross-cueing control 107 can send a reactive cursor control command 312 to the GUI 103 to cause the reactive cursor to be properly positioned over the selected place or target.

Figure 4:
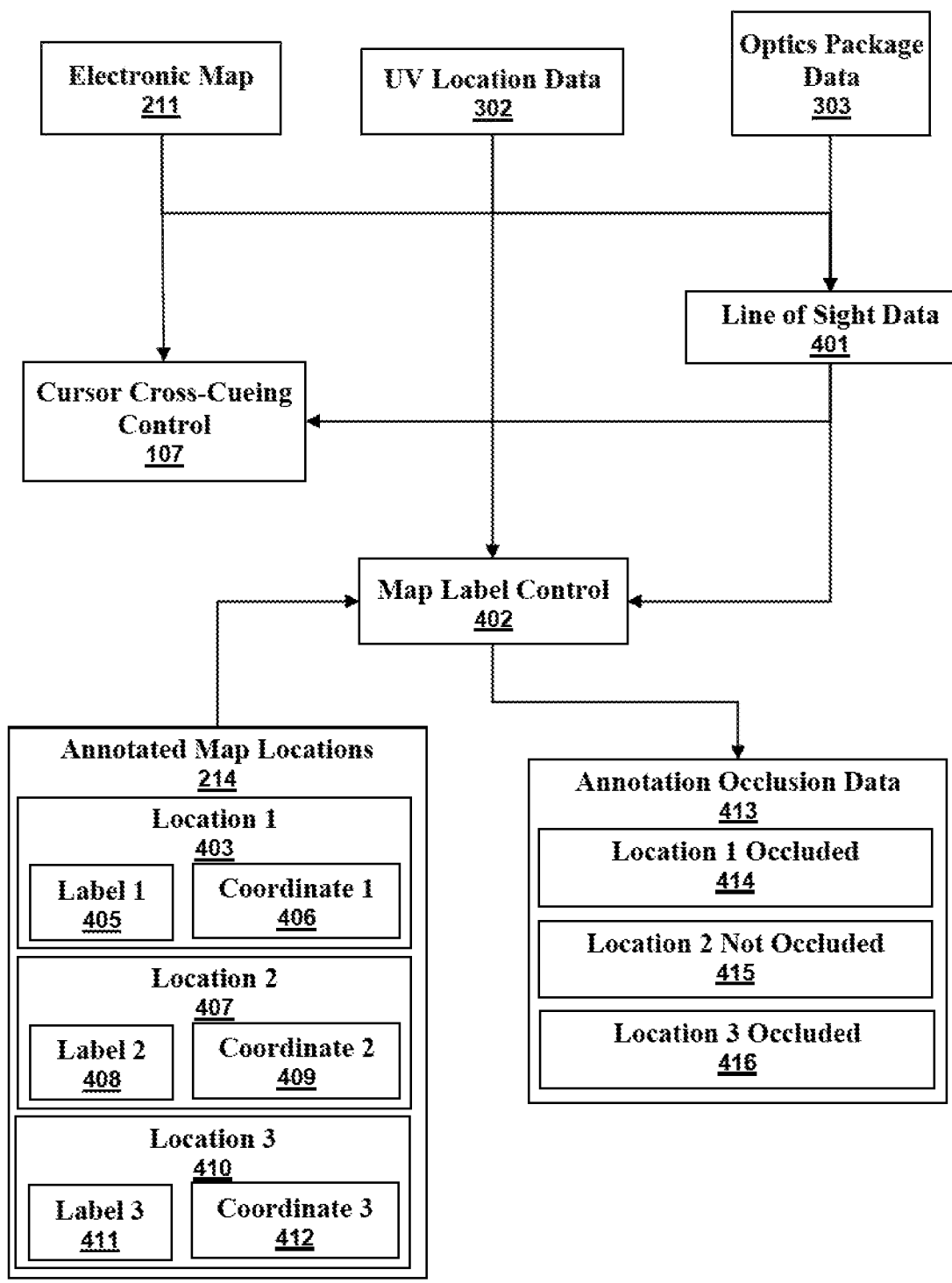
FIG. 4 illustrates augmented reality cross-cueing with line-of-sight data in accordance with aspects of the embodiments.

FIG. 4 illustrates augmented reality cross-cueing with line-of-sight data 401 in accordance with aspects of the embodiments. As discussed above, the visibility of any spot on the map can be calculated given the absolute location (coordinates and altitude) of the UV and the terrain height throughout the map. Map label control 402 can use the line of sight data to determine if annotated map locations 214 are within the UV's line of sight. Location 1 403 is at coordinate 1 406 and is annotated with label 1 405. Location 2 407 is at coordinate 2 409 and is annotated with label 2 408. Location 3 410 is at coordinate 3 412 and is annotated with label 3 411. For each location 403, 407, 410, map label control 402 checks line of sight data 401 to determine annotation occlusion data 413 that indicates location 1 is occluded 414, location 2 is not occluded 415, and location 3 is occluded 416. Map label control 402 may need to cause the system to determine line of sight data for the location coordinates 406, 409, and 412. Map label control 402 can use the annotation occlusion data 413 to determine how or if a label should be displayed in one of the views 105, 106. For a non-occluded location, the label can be displayed brightly, bolded, or in some other manner. For an occluded location, the label can be not displayed at all, displayed dimly, subdued, greyed, or in a smaller or non-bold font.

Figure 5:
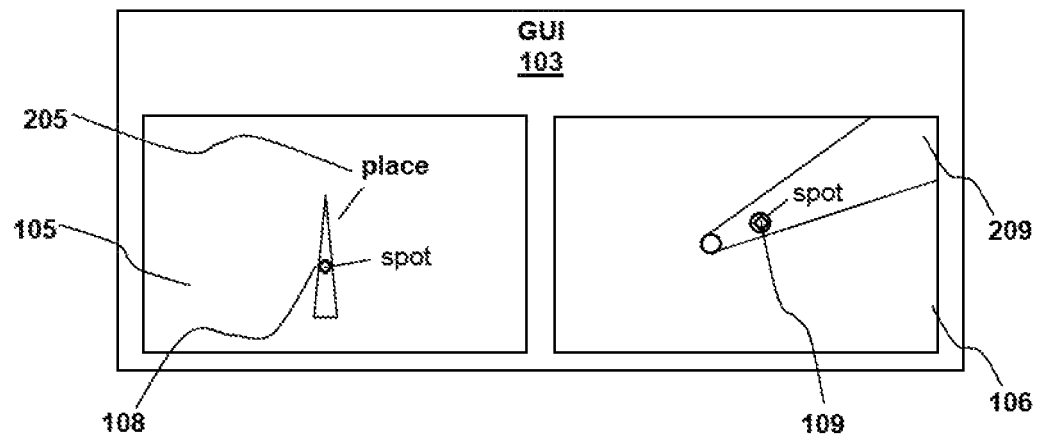
FIG. 5 illustrates a graphical user interface indicating an occluded area in accordance with aspects of the embodiments.

FIG. 5 illustrates a graphical user interface 103 indicating an occluded area 209 in accordance with aspects of the embodiments. The "spot" location cannot be seen in the camera view and user has selected "spot" in the map view. The map cursor is the active cursor and the system has moved the camera cursor 108 to indicate where "spot" is located. The "spot" label is shown in a more subdued font than the "place" label because "spot" is not in the field of view. The "spot" label appears in the camera view because the system is configured to show labels for occluded locations or because the system is configured to show labels for places the user selects.

Figure 6:
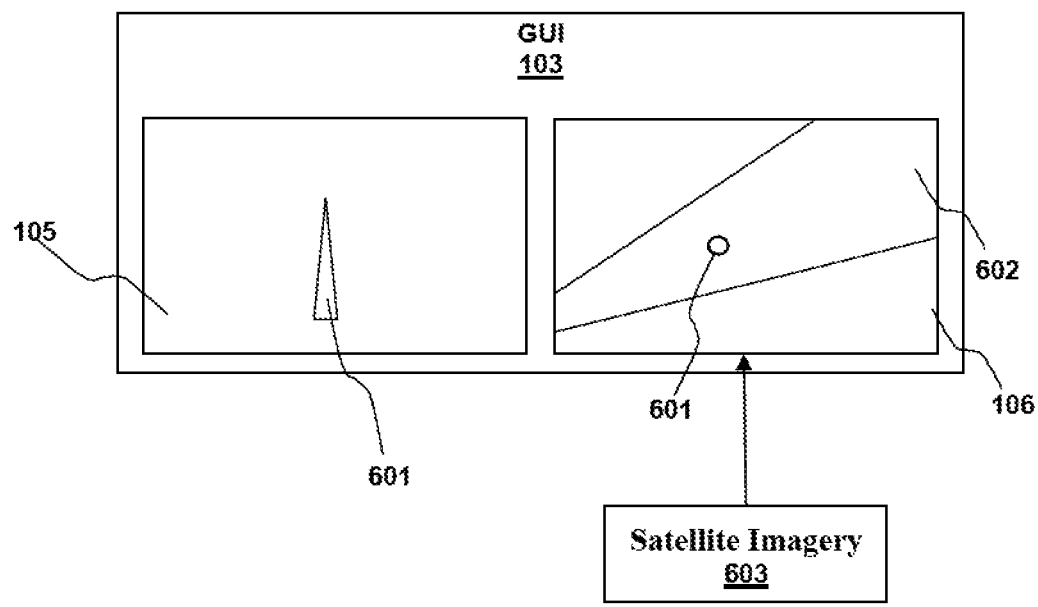
FIG. 6 illustrates a graphical user interface showing an indicated camera view in accordance with aspects of the embodiments.

FIG. 6 illustrates a graphical graphical user interface showing an indicated camera view 602 in accordance with aspects of the embodiments. In this example, the indicated camera view is the area between two lines. Such camera views are typical when the UV is at a low altitude. At higher altitudes, the indicated camera view can become essentially trapezoidal with the short side facing the UV location. A structure 601 appears in both views with the map view 106 in this example presenting satellite imagery 603.

Figure 7:
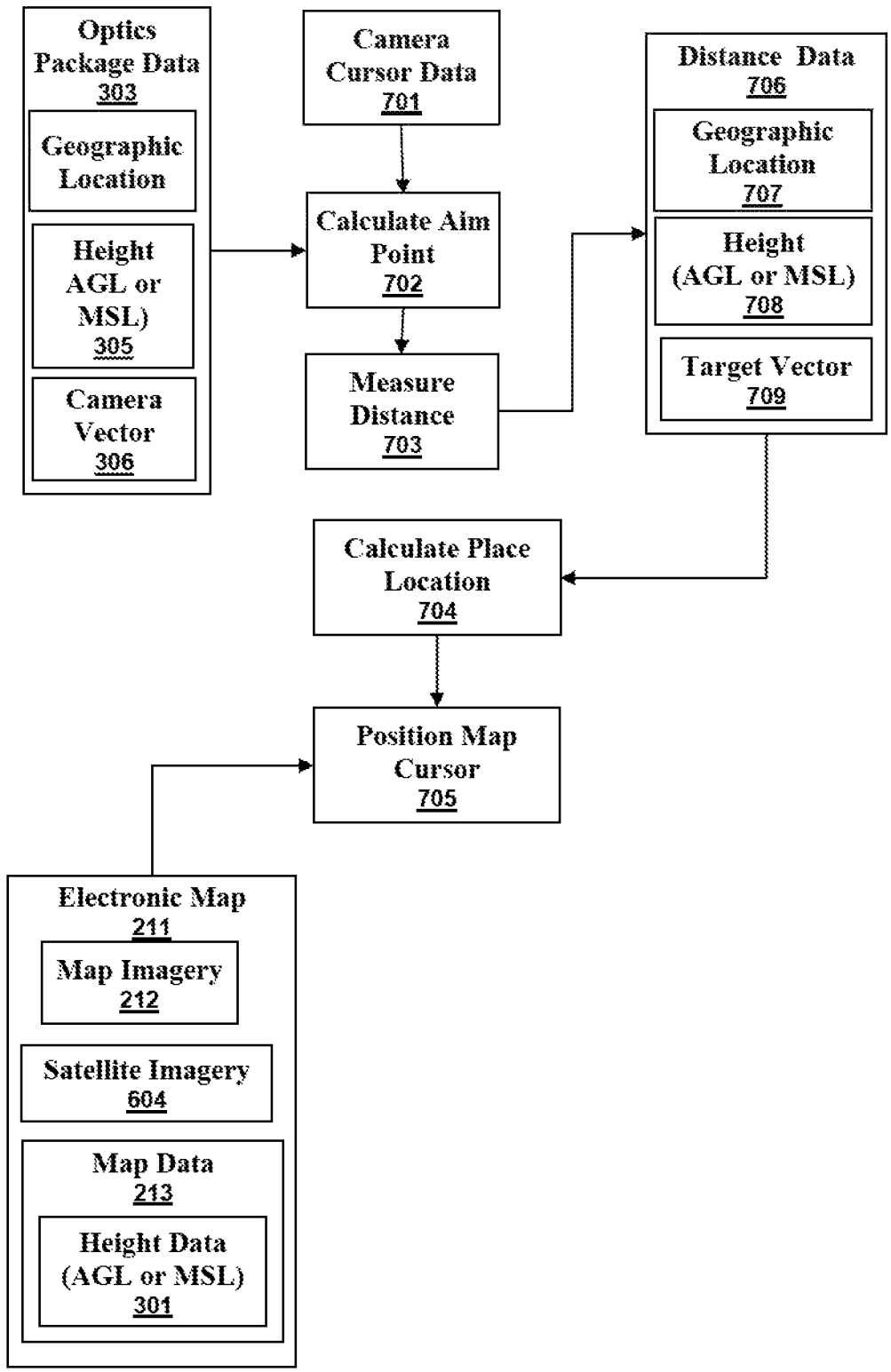
FIG. 7 illustrates an augmented reality cross-cueing with a distance measuring device in accordance with aspects of the embodiments.

FIG. 7 illustrates an augmented reality cross-cueing with a distance measuring device in accordance with aspects of the embodiments. Typically, the distance measuring device can be used when the camera cursor is the active cursor or to verify map scaling and UV position when the active cursor is the map cursor. Camera cursor data 701 can be used to determine the aim point 702 of the distance measuring device. The distance is measured 703. Distance data 706 including the UV's geographic location 707, altitude 708, and the target vector 709 which provide the direction and distance, as measured, from the UV to the target. Standard trigonometry, cartographic, or surveying calculations can be used to determine the place location 704. The map cursor is then positioned 705 on the map 211.

Figure 8:
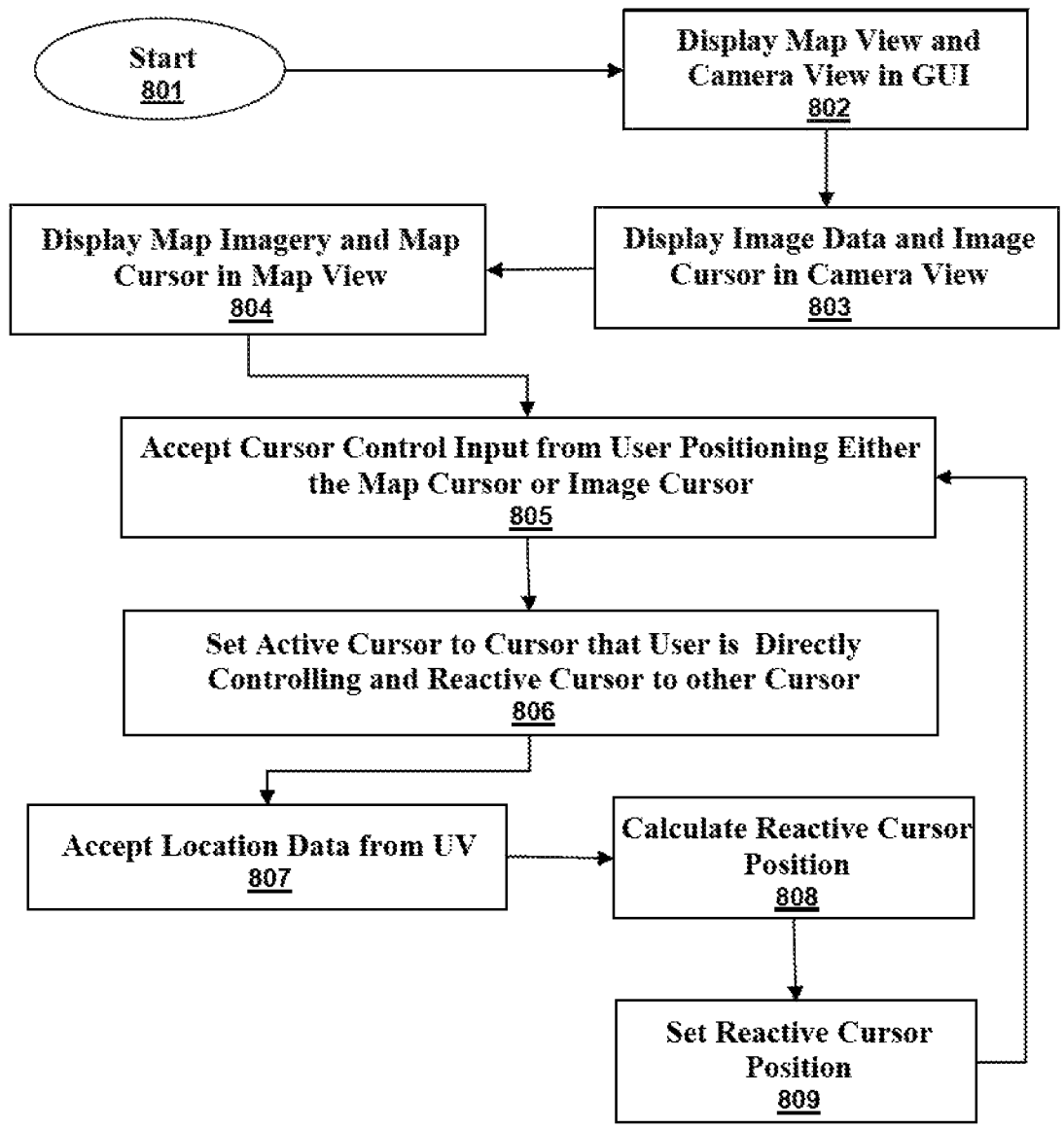
FIG. 8 illustrates a high level flow diagram of an augmented reality cross-cueing system in accordance with aspects of the embodiments.

FIG. 8 illustrates a high level flow diagram of an augmented reality cross-cueing system in accordance with aspects of the embodiments. After the start 801, the map view and camera view are displayed in the GUI 802. The image data and image cursor are displayed in the image view 803. The map imagery and map cursor are displayed in the map view 804. The user positions the map cursor or the image cursor and the cursor control input is accepted 805. The active cursor is set to the one the user is directly controlling and the reactive cursor is set to that one of the map cursor and camera cursor that the user is not directly controlling 806. Location data from the UV is accepted 807 and the position of the reactive cursor within the reactive view is determined 808. The system moves the reactive to the determined position 809 and the process repeats by waiting to accept more user input 805.

The embodiment and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those skilled in the art following the reading of this disclosure, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A system comprising:
a ground station comprising a graphical user interface (GUI) and a cursor control device, wherein the GUI comprises a map view, a camera view, a map cursor, and a camera cursor, wherein the ground station is configured to communicate with an unmanned vehicle (UV) comprising a geographic position sensor and a camera, wherein the camera produces a live video stream that is transmitted to the ground station, and wherein the live video stream is displayed in the camera view;
an electronic map comprising map imagery wherein at least a portion of the map imagery is displayed in the map view;
wherein the map cursor is displayed within the map view, wherein the camera cursor is displayed within the camera view;
wherein a user operates the cursor control device to move the camera cursor to indicate a place, and wherein the map cursor is automatically positioned to also indicate the place.

2. The system of claim 1 wherein operating the cursor control device to move the map cursor to indicate a second place causes the camera cursor to be automatically positioned to also indicate the second place.

3. The system of claim 2 wherein the electronic map further comprises height data of geographic features, wherein line of sight data is calculated at least in part on UV location data, wherein the line of sight data indicates that the second place is at an occluded map location, wherein the second place is labeled in the map view indicating the second place is at an occluded map location, and wherein the second place is not labeled in the camera view because the occluded map location is not visible to the UV.

4. The system of claim 2 wherein the electronic map further comprises height data of geographic features, wherein line of sight data is calculated at least in part on UV location data, wherein the line of sight data indicates that the second place is at an occluded map location, and wherein a label in the camera view indicates a location of the second place and indicates that the location is not visible to the UV.

5. The system of claim 2 wherein the electronic map further comprises height data of geographic features, wherein line of sight data is calculated at least in part on UV location data, wherein the line of sight data indicates that the second place is at an occluded map location, and wherein the camera cursor is changed in appearance to indicate that the second place is not visible to the UV.

6. The system of claim 1 wherein the electronic map further comprises height data of geographic features, wherein line of sight data is calculated at least in part on UV location data, wherein the map view indicates an occluded area that is occluded from view of the camera.

7. The system of claim 1 wherein the electronic map further comprises height data of geographic features, wherein line of sight data is calculated at least in part on UV location data, wherein the line of sight data indicates that the place is not visible from the UV, and wherein at least one of the map cursor and the camera cursor indicates that the place is not visible from the UV.

8. The system of claim 1 wherein the electronic map further comprises height data of geographic features, wherein line of sight data is calculated at least in part on UV location data, wherein the line of sight data indicates that the place is a map feature that occludes an area behind the map feature, and wherein the map cursor is positioned to indicate the map feature.

9. The system of claim 1 wherein the UV comprises a distance measuring device, wherein aiming the distance measuring device does not also aim the camera, wherein the place is visible in the camera view, wherein the distance measuring device measures a distance to the place, and wherein the map cursor is positioned to indicate the place.

10. The system of claim 1 wherein the place is visible in the live video stream wherein the live video stream is processed to calculate a distance to the place, and wherein the map cursor is positioned to indicate the place.

11. The system of claim 1 wherein the map view comprises a UV icon indicating the position and heading of the UV, wherein the map view comprises a graphic indicating the camera view, and wherein the camera is pointed in a direction other than the heading.

12. The system of claim 1 wherein the map view comprises a graphic showing map imagery that is within the camera view.

13. The system of claim 1 further comprising satellite imagery wherein at least a portion of the satellite imagery is displayed in the map view.

14. A method comprising:
  displaying a map view and a camera view wherein a graphical user interface (GUI) comprises the camera view and the map view, wherein a ground station comprises the GUI and a cursor control device;
  receiving a live video stream from an unmanned vehicle (UV) comprising geographic position sensor and a camera producing the live video stream;
  displaying the live video stream and a camera cursor in the camera view;
  displaying map imagery and a map cursor in the map view;
  accepting a cursor control input wherein a user operates the cursor control device to move the camera cursor to indicate a place; and
  automatically positioning the map cursor to also indicate the place.

15. The method of claim 14 further comprising:
  accepting location data from the UV wherein the location data comprises a geographic position of the UV and a vector, and wherein the vector indicates a pointing direction of the camera wherein the pointing direction of the camera is not the heading.

16. The method of claim 14 further comprising:
  accepting another cursor control input wherein a user operates the cursor control device to move the map cursor to indicate a second place; and
  automatically positioning the camera cursor to also indicate the second place.

17. The method of claim 14 further comprising:
  indicating on the map view a position and a heading of the UV; and
  indicating a camera view area on the map view by drawing a visible boundary on the map view.

18. The method of claim 14 further comprising:
  calculating line of sight data based on UV location data and an electronic map; and
  modifying the camera cursor and the map cursor to indicate that the place is not visible from the UV.

19. The method of claim 14 further comprising:
  calculating line of sight data based on UV location data and an electronic map; and
  positioning the map cursor over a map feature wherein the line of sight data indicates that the map feature occludes the place.

20. A system comprising:
  a ground station comprising a graphical user interface (GUI) and a cursor control device, wherein the GUI comprises a map view, a camera view, a map cursor, and a camera cursor;
  an unmanned vehicle (UV) wherein the UV comprises laser ranging device, a geographic position sensor, a heading sensor, and a camera producing a live video stream, a camera turret that aims the camera without changing the UV heading, and a turret that that aims the laser ranging device without aiming the camera, wherein the live video stream is transmitted to the ground station and displayed in the camera view;
  an electronic map comprising map imagery wherein at least a portion of the map imagery is displayed in the map view, wherein the map cursor is displayed within the map view, wherein the camera cursor is displayed within the camera view, wherein operating the cursor control device to move the map cursor to indicate a second place causes the camera cursor to be automatically positioned to also indicate the second place; and wherein operating the cursor control device to move the camera cursor to indicate a second place causes the map cursor to be automatically positioned to also indicate the second place;
  a plurality of annotated map locations, wherein at least one of the annotated map locations is labeled in the map view and in the camera view;

height data of geographic features wherein the electronic map further comprises the height data of geographic features;

line of sight data calculated at least in part on UV location data, wherein the line of sight data indicates that one of the annotated map locations is occluded from view by the UV, wherein the one of the annotated map locations is not labeled in the camera view, wherein the line of sight data indicates that another one of the annotated map locations is occluded from view by the UV, wherein the another one of annotated map locations is labeled in the camera view indicating that the another one of annotated map locations is not visible to the UV, wherein the line of sight data indicates that yet another one of the annotated map locations is occluded from view by the UV, wherein the yet another one of the annotated map locations is labeled in the map view indicating that yet another one of the annotated map locations is not visible to the UV, wherein the map view indicates an area that is not visible to the UV, wherein the line of sight data indicates when the place is not visible from the UV, wherein at least one of the map cursor and the camera cursor indicates when the place is not visible from the UV, and wherein the map cursor is positioned to indicate the map feature when the place is not visible from the UV;

wherein the UV measures a distance to the place when the place is visible to the UV, wherein the image data is processed to calculate a confirming distance to the place;

wherein at least a portion of the map view displays satellite imagery;

wherein the map view comprises a UV icon indicating the position and heading of the UV; and wherein the map view comprises a graphic indicating the camera view area by drawing a visible boundary on the map view.

\* \* \* \* \*